US008853515B1

(12) United States Patent
Stannard

(10) Patent No.: US 8,853,515 B1
(45) Date of Patent: Oct. 7, 2014

(54) REVERSIBLE CYMBAL

(76) Inventor: John Stannard, Clearwater, FL (US)

( * ) Notice: Subject to any disclaimer, the term of this patent is extended or adjusted under 35 U.S.C. 154(b) by 141 days.

(21) Appl. No.: 13/350,208

(22) Filed: Jan. 13, 2012

Related U.S. Application Data

(60) Provisional application No. 61/432,485, filed on Jan. 13, 2011.

(51) Int. Cl.
*G01D 13/02* (2006.01)

(52) U.S. Cl.
USPC .......................................................... 84/422.1

(58) Field of Classification Search
USPC .................. 84/402–410, 422.1, 422.2, 422.3
See application file for complete search history.

(56) References Cited

U.S. PATENT DOCUMENTS 2,189,095 A * 2/1940 Zildjian .......................... 84/402
7,952,009 B2 * 5/2011 Stannard ...................... 84/422.1
2005/0155483 A1 * 7/2005 Anderson .................... 84/422.3

FOREIGN PATENT DOCUMENTS

DE 3319546 A1 * 11/1984 .................. 84/422.1

* cited by examiner

*Primary Examiner* — Kimberly Lockett
(74) *Attorney, Agent, or Firm* — Allen Dyer Doppelt Milbrath & Gilchrist, P.A.

(57) ABSTRACT

A reversible cymbal includes a central cup surrounded by a remainder of the cymbal. The cymbal is repeatedly reversible between a first configuration, in which curvatures of the cup and the remainder of the cymbal are in the same direction, and a second configuration, in which the curvatures are opposite, without damage to the cymbal. The cymbal can be played in both first and second configurations.

16 Claims, 2 Drawing Sheets

REVERSIBLE CYMBAL

CROSS-REFERENCE TO RELATED APPLICATION

This application claims the benefit of U.S. Provisional Application Ser. No. 61/432,485, filed on Jan. 13, 2011, the contents of which are herein incorporated by reference in their entirety.

FIELD OF THE INVENTION

The present invention relates to cymbals and methods of making and using the same.

BACKGROUND OF THE INVENTION

Many cymbals possess a center cup, having a smaller curvature radius than the remainder of the cymbal. In one type of cymbals, the curvature of the cup and of the remainder of the cymbal, though different in radius, are in the same direction. Examples of this type of cymbal include “splash,” “crash” and “ride” cymbals. In another general type of cymbals, the cup and the remainder of the cymbal are curved in different directions. A “china” cymbal is an example of this type.

In some existing cymbals, the inadvertent application of force to the cymbal can cause a “reversal” of the cymbal—where the curvature of the remainder of the cymbal reverses relative to the curvature of the cup. Examples of this inadvertent application of force include over-clamping of the cymbal within certain types of carrying cases, or stepping on a cymbal placed on the floor. Significantly, percussionists regard this as a catastrophe, and rightly so, as the reversal frequently results in the fracture of the cymbal. Even where the cymbal survives the initial reversal, fracture of the cymbal will often attend the attempted restoration of the original curvature. No conventional cymbal is adapted to survive repeated, intentional reversals of the curvature of the remainder of the cymbal relative to the cup.

SUMMARY OF THE INVENTION

In view of the foregoing, it is an object of the present invention to provide a reversible cymbal, that is repeatedly reversible between a first configuration, in which the curvatures of the cup and the remainder of the cymbal are in the same direction, and a second configuration, in which the curvatures are opposite.

These and other objects, aspects and advantages of the present invention will be better appreciated in view of the drawings and following detailed description of a preferred embodiment.

DETAILED DESCRIPTION OF A PREFERRED EMBODIMENT

Figure 1:
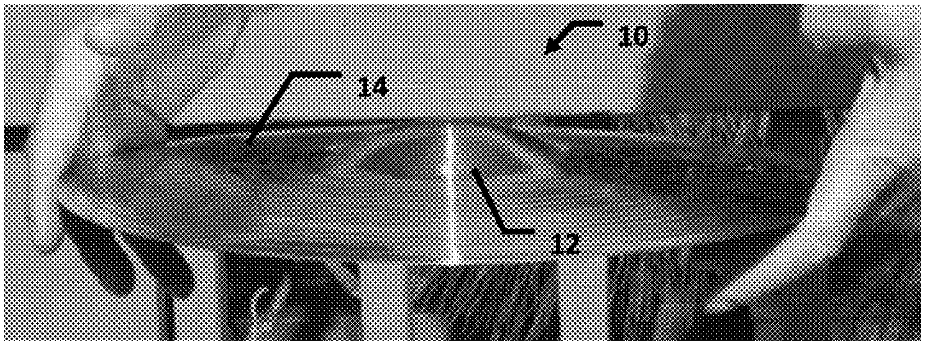
FIG. 1 is a perspective view of a reversible cymbal, according to an embodiment of the present invention, in a first configuration.
Figure 2:
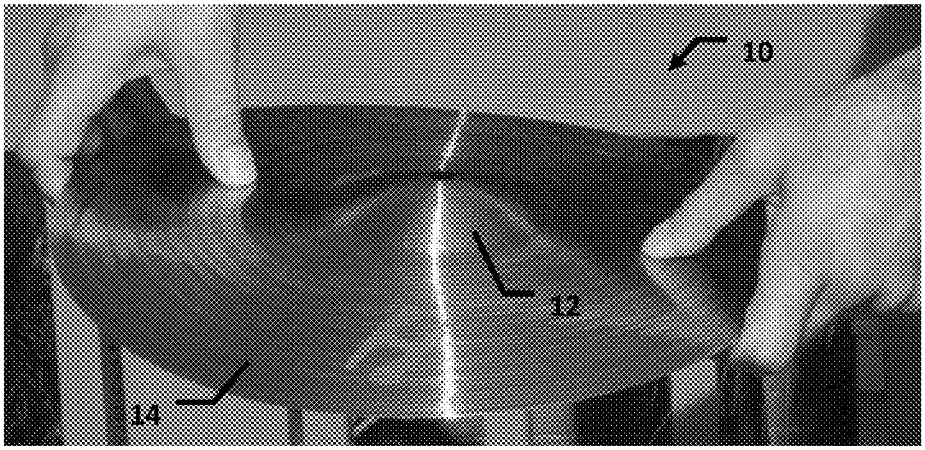
FIG. 2 is a perspective view of the cymbal of FIG. 1, during transition from the first configuration to a second configuration.
Figure 3:
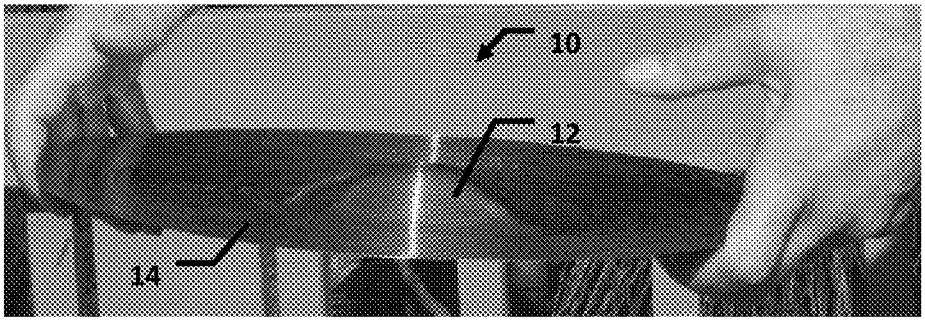
FIG. 3 is a perspective view of the cymbal of FIG. 1, in the second configuration.
Figure 4:
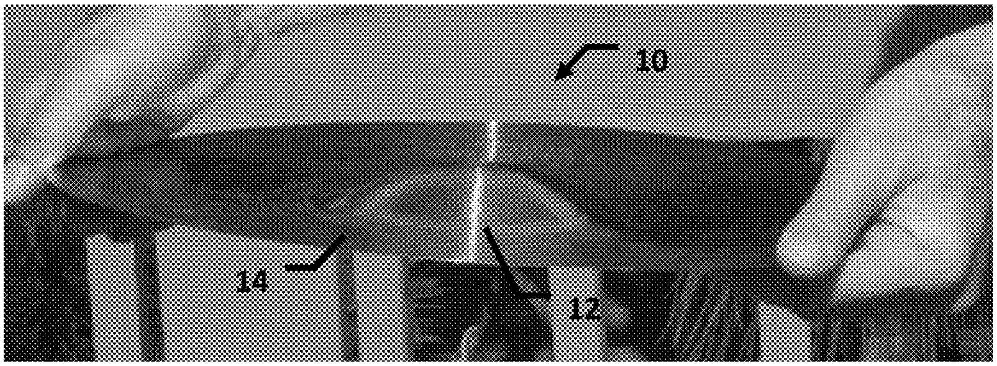
FIG. 4 is a perspective view of the cymbal of FIG. 1, during transition from the second configuration to the first configuration.
Figure 5:
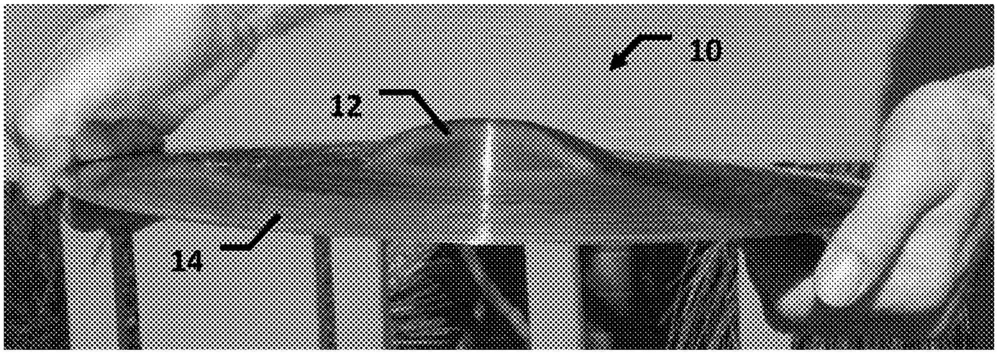
FIG. 5 is a perspective view of the cymbal of FIG. 1, returned to the first configuration.

With reference to FIG. 1-5, a cymbal 10 of the present invention is adapted for repeated reversal between a first configuration, in which the curvatures of the cup 12 and the remainder of the cymbal 14 surrounding the cup 12 are in the same direction, and a second configuration, in which the curvatures are opposite, without damage to the cymbal 10. The cup 12 and remainder 14 are integrally joined with one another, preferably being formed from the same piece of material. The cymbal 10 can advantageously exhibit an extremely fast decay in volume after striking.

To facilitate the reversibility of the cymbal 10 without damage, a preferred range of thickness is approximately 0.013 inches to approximately 0.042 inches with a most preferred thickness falling in the middle of that range. It is not necessary that the thickness be uniform throughout the cymbal 10. Preferably, the portions of the cymbal 10 from the boundary between the cup 12 and the remainder 14 of the cymbal out through the edge of the cymbal 10 all fall within the preferred thickness range.

A preferred diameter for the cymbal 10 is from approximately 6 inches to approximately 24 inches with a most preferred diameter being from approximately 9 inches to approximately 18 inches.

For the composition of the cymbal, a preferred bronze alloy includes approximately 6 to approximately 16 percent tin, approximately 0.02 to approximately 0.50 percent each of nickel and iron for use as grain refining agents, approximately 0.005 and approximately 0.70 percent phosphorous, less than approximately 1% total trace elements, with a remainder being copper.

Tin in the range of approximately 9 to approximately 13 percent is most preferred. The reversibility of the cymbal is particularly facilitated by the increase in tensile strength offered by the nickel/iron grain refiners in the cymbal bronze. When tested, a cymbal according to the present invention was recorded with a high fidelity audio system before and after 300 back and forth reversals from the first to the second configurations. When compared over time, no change in pitch or general sound character was evinced in either configuration.

In the Figures, the reversal is shown being accomplished with the application of manual pressure. Another shifting option, when the cymbal 10 is suspended in the second configuration with the central cup 12 opening downwards, is to sharply strike the edge of the cymbal 10 downwardly with a drumstick or other implement one or more times to effect a reversal. If extended play in the second configuration without inadvertent reversal is desired, the cymbal 10 can be suspended with the central cup 12 opening upwards, such that striking the edge downwardly will not tend to cause a reversal.

Phosphor bronze with nickel/iron grain refiner is a preferred alloy in this invention; however, other alloys can be used however. A variety of stainless steels can respond very well to work hardening and reach very high strengths and can be suited to reversing. Titanium and tool steels can also be used. In general, the use of steels that can be strengthened and/or hardened through a heat treating process is believed to be advantageous relative to steels that cannot.

Based on testing, an ideal alloy strength for a cymbal according the present invention is at least approximately 120,000 pounds per square inch with substantially shock resistance qualities, and/or in the range of approximately 120,000 and approximately 400,000 pounds per square inch tensile strength. Metal in this range is very hard and can easily crack if formed incorrectly.

Due to the thin preferred cross section of this invention, a very strong cup should be formed while retaining a very thin cross section in the main body, and the cup can be formed much thicker than the rest of the cymbal. The traditional method of cymbal cup making which involves use a press to form the center cup, is non-preferred.

Formed metal when struck with a hard hammer and anvil must move somewhere. It was discovered by the present inventor that by creating very deep dents in very close proximity, a matrix of high and low areas is formed because the metal from the low area is pushed up to form a higher and hence thicker area. This interlocked matrix creates an effect similar to thicker metal.

In some cases, a thickening of high areas in the matrix could exceed 10% thicker that the original cross-section of the material. This is significant in percussion instruments, which respond in a non-linear fashion to changes in thickness.

The applicant owns a collection of several hundred cymbals from many countries and all hammer dents are distanced apart so that the metal around them does not create thicker areas. In cases where dents in prior cymbals were closely spaced, the dents tended to be "stretch formed" where the dent thinned the metal.

This method of forming also adds strength because the metal grain is formed and work-hardened not just along the x-y plane, but along the "z" axis or in the "up/down" direction. Furthermore, nickel/iron grain refiners are particularly suited to this method of forming. This forming of interlocking deep-formed dents allows the creation of a strong and effectively thicker cup, which is preferred in connection with the cymbal of the present invention, and can advantageously be incorporated into other cymbals, as well. For example, the forming of interlocking deep-formed dents allows better tonal sound in thicker, non-reversible, cymbals.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A reversible cymbal comprising a central cup surrounded by a remainder of the cymbal, the cymbal being repeatedly reversible between a first configuration, in which curvatures of the cup and the remainder of the cymbal are in the same direction, and a second configuration, in which the curvatures are opposite, without damage to the cymbal;

wherein the cymbal is reversible through 300 cycles between the first and second configuration without a detectable change in pitch or general sound character of the cymbal in either configuration.

2. A reversible cymbal comprising a central cup surrounded by a remainder of the cymbal, the cymbal being repeatedly reversible between a first configuration, in which curvatures of the cup and the remainder of the cymbal are in the same direction, and a second configuration, in which the curvatures are opposite, without damage to the cymbal;

wherein a thickness of the cymbal from a boundary between the cup and the remainder of the cymbal out through an edge of the cymbal is between approximately 0.013 includes and approximately 0.042 inches.

3. The cymbal of claim 1, wherein a thickness of the cup is greater than a thickness of the remainder of the cymbal.

4. The cymbal of claim 1, wherein a diameter of the cymbal is between approximately 6 inches and approximately 24 inches.

5. The cymbal of claim 4, wherein a diameter of the cymbal is between approximately 9 inches and approximately 18 inches.

6. A reversible cymbal comprising a central cup surrounded by a remainder of the cymbal, the cymbal being repeatedly reversible between a first configuration, in which curvatures of the cup and the remainder of the cymbal are in the same direction, and a second configuration, in which the curvatures are opposite, without damage to the cymbal;

wherein the cymbal is made of a phosphor bronze alloy including:

approximately 6 percent to approximately 16 percent tin;

approximately 0.02 to approximately 0.50 percent each of nickel and iron as grain refiners;

approximately 0.005 to approximately 0.70 percent phosphorus;

less than approximately 1 percent total trace elements;

and a remainder being copper.

7. The cymbal of claim 6, wherein the tin is present as approximately 9 to approximately 13 percent of the alloy.

8. The cymbal of claim 1, wherein the cymbal is made of stainless steel.

9. The cymbal of claim 1, wherein the cymbal is made of titanium.

10. The cymbal of claim 1, wherein the cymbal is made of tool steel.

11. The cymbal of claim 1, wherein the cymbal is made of a steel strengthened or hardened through a heat treating process.

12. A reversible cymbal comprising a central cup surrounded by a remainder of the cymbal, the cymbal being repeatedly reversible between a first configuration, in which curvatures of the cup and the remainder of the cymbal are in the same direction, and a second configuration, in which the curvatures are opposite, without damage to the cymbal;

wherein an alloy strength of the cymbal is between approximately 120,000 pounds per square inch and approximately 400,000 pounds per square inch.

13. The cymbal of claim 1, wherein the cymbal includes a matrix of dents in close proximity creating a matrix of thicker high and thinner low areas.

14. A method of using a reversible cymbal comprising:

reversing the cymbal between a first configuration in which curvatures of a cup and a remainder of the cymbal are in the same direction, and a second configuration, in which the curvatures are opposite; and playing the cymbal in both the first and second configurations;

wherein the cymbal is played in the second configuration with the cup opening downwards, and the cymbal is reversed to the first configuration by striking an edge of the cymbal downwardly.

15. A method of using a reversible cymbal comprising:

reversing the cymbal between a first configuration in which curvatures of a cup and a remainder of the cymbal are in the same direction, and a second configuration, in which the curvatures are opposite; and playing the cymbal in both the first and second configurations;

wherein the cymbal is reversed by the application of manual pressure.

16. A method of using a reversible cymbal comprising:
reversing the cymbal between a first configuration in which curvatures of a cup and a remainder of the cymbal are in the same direction, and a second configuration, in which the curvatures are opposite; and
playing the cymbal in both the first and second configurations;
wherein the reversing step is performed at least twice.

* * * * *